United States Patent [19]

Ookubo et al.

[11] Patent Number: 5,203,205
[45] Date of Patent: Apr. 20, 1993

[54] FREEZING AGENT CONSUMPTION MEASUREMENT SYSTEM

[75] Inventors: Osamu Ookubo; Tsugio Watanabe, both of Akou, Japan

[73] Assignee: Mitsubishi Denki K.K., Tokyo, Japan

[21] Appl. No.: 734,713

[22] Filed: Jul. 23, 1991

[30] Foreign Application Priority Data

Aug. 22, 1990 [JP] Japan ................................ 2-221851

[51] Int. Cl.⁵ ............................................. G01F 15/02
[52] U.S. Cl. ......................................................... 73/199
[58] Field of Search ................................. 73/199, 198

[56] References Cited

U.S. PATENT DOCUMENTS

| | | | |
|---|---|---|---|
| 2,049,239 | 7/1936 | Wilcox | 73/199 X |
| 2,067,335 | 1/1937 | Pardee | 73/199 |
| 2,291,678 | 8/1942 | Benz et al. | 73/199 X |
| 2,402,355 | 6/1946 | Whaley, Jr. | 73/199 X |
| 3,021,684 | 2/1962 | Bercit | 73/199 X |
| 3,076,337 | 2/1963 | Gehre | 73/199 |
| 4,577,495 | 3/1986 | Bamer | 73/199 X |

FOREIGN PATENT DOCUMENTS 946563 1/1964 United Kingdom .

*Primary Examiner*—Herbert Goldstein
*Attorney, Agent, or Firm*—Sughrue, Mion, Zinn, Macpeak & Seas

[57] ABSTRACT

In a freezing agent consumption measurement system for measuring the consumption of the freezing agent in a low-temperature container, due to evaporation of the freezing agent, including a gas flow meter provided in the gas flow path to measure the flow of the evaporated gas from the freezing agent, a tank is provided in the gas flow path means, and the pressure in the tank is maintained at a predetermined value. The measurement of the flow of the gas is not affected by the variation in the atmospheric pressure, and accordingly accurate measurement of the consumption of the freezing agent is accomplished.

5 Claims, 3 Drawing Sheets

5,203,205

FREEZING AGENT CONSUMPTION MEASUREMENT SYSTEM

FIELD OF THE INVENTION

The present invention relates to a freezing agent consumption measurement system.

BACKGROUND OF THE INVENTION

A agent is used in a low-temperature container to keep the temperature very low. An example of freezing agent is liquid helium. The container (e.g., cryostat for a superconducting magnet) is formed to prevent transfer of heat from the outside. But as it is not possible to completely shut off the heat transfer, the freezing agent is evaporated to keep the temperature within the container at the desired value. The evaporated freezing agent is discharged through a path, such as a tube, to the outside. It is necessary to measure the amount of the freezing agent that has been consumed in order to the freezing agent consumption characteristics.

A prior-art freezing agent consumption measurement system is shown in FIG. 1. As illustrated, a freezing agent, such as liquid helium 2, is accommodated in a low-temperature container 1. The evaporated freezing agent is discharged through a tube 4. A gas mass flow meter 5 is connected to the end of the tube 4 to measure the mass flow rate of the gas that is discharged. The results of the measurement, flow rate, is recorded by a recorder, e.g., a pen recorder, connected to the flow meter 5.

The outlet 5b of the gas flow meter 5 is open to the atmosphere, so the gas that flows through the tube 4 and the flow meter 5 is discharged to the atmosphere.

A problem associated with the prior art freezing agent consumption measurement system is that as the atmospheric pressure changes, the flow of the evaporated gas is affected. That is, the flow of the evaporated gas is varied even if the consumption, i.e., the rate of evaporation, of the freezing agent is constant, and the flow of the evaporated gas does not accurately correspond to the consumption of the freezing agent.

SUMMARY OF THE INVENTION

An object of the invention is to provide a freezing agent consumption measurement system which can measure the consumption of freezing agent without being affected by the changes of the atmospheric pressure.

A freezing agent consumption measurement system according to the invention comprises a constant-pressure tank of which the pressure is kept constant, and conduit means connecting the outlet of the flow meter to the tank, Means for controlling the tank pressure may comprise a valve whose opening is controlled according to the tank pressure. For instance, the tank pressure may be set to a value a little higher than the range of the pressure over which the atmospheric pressure varies under normal condition, and the opening of the valve is increased when the tank pressure is high, and is decreased when the tank pressure is low.

DETAILED DESCRIPTION OF THE PREFERRED EMBODIMENTS

Figure 2:
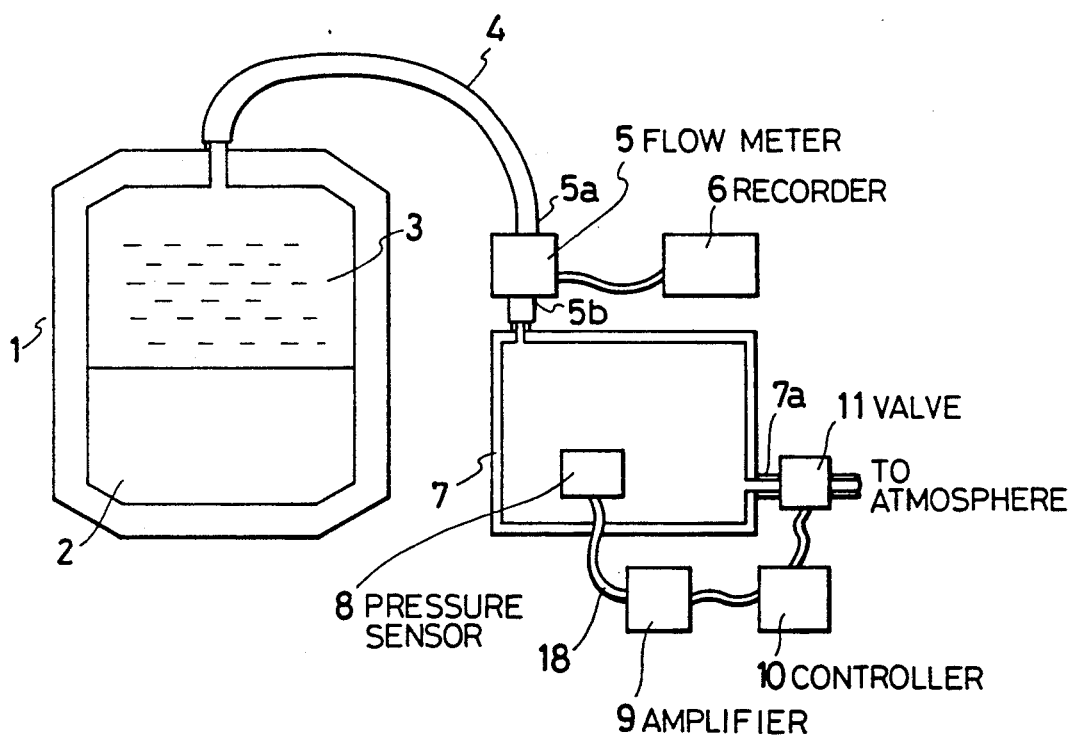
FIG. 2 is a schematic view showing a freezing agent consumption measurement system of an embodiment of the invention.

Referring to FIG. 2, a freezing agent, such as liquid helium 2, is accommodated in a low-temperature container 1. The evaporated freezing agent is discharged through a tube 4. A gas mass flow meter 5 is connected to the end of the tube 4 to measure the mass flow of the gas that is discharged. The results of the measurement, flow rate, is recorded by a recorder, e.g., a pen recorder, connected to the flow meter 5.

The outlet 5b of the gas flow meter 5 is connected to a constant-pressure tank 7 having an outlet 7a for communication with the atmosphere through an electromagnetic valve 11 whose aperture or opening (the degree at which the gas is permitted to flow through the valve) is continuously variable in accordance with an electrical signal supplied to it via electrical conductors 18.

A gas pressure sensor 8 detects the pressure inside the tank 7, and its output is amplified by an amplifier 9. The output signal of the amplifier 9 is sent to an electromagnetic valve controller 10. The controller 10 compares the actual pressure within the tank as represented by the signal from the amplifier 9, with a certain predetermined threshold. This threshold may preferably corresponds to the pressure, e.g., 1040 mbar, a little higher than the range of the pressure over which the atmospheric pressure varies under normal conditions. Responsive to the result of the comparison, the controller 10 produces an electrical signal which determines the opening of the electromagnetic valve 11. For instance, when the actual pressure is lower than the reference value, the controller 10 supplies such an electrical signal as to decrease the opening of the electromagnetic valve 11. When the actual pressure is higher than the reference valve, the controller 10 supplies such an electrical signal as to increase the opening of the electromagnetic valve 11.

The gas flowing through the valve 11 is discharged to the atmosphere.

In operation, because of heat transferred into the container 1 from the outside, the freezing agent 2 is evaporated to maintain the temperature within the container 1 at the desired level. The evaporated gas passing through the gas mass flow meter 5 enters the tank 7, and then is discharged to the atmosphere through the electromagnetic valve 11. The flow of the gas through the electromagnetic valve 11 is however regulated as described above in order to maintain the pressure inside the tank 7 constant. The gas flow rate through the flow meter 5 is therefore not affected by the changes in the atmospheric pressure, and the flow rate as measured by the flow meter 5 accurately corresponds to the rate of consumption of the freezing agent within the container 1. In other words, accurate measurement on the consumption of the freezing agent is accomplished.

In determining the electrical signal supplied to the valve 11, the controller 11 may perform any of the known control operation for keeping the pressure at a constant value. The control operation performed by the controller 11 may involve not only proportional (P) control action, but also integral (I) control action, and/or derivative (D) control action, which themselves are well known in the art.

In the embodiment described, the opening of the electromagnetic valve is continuously variable. The electromagnetic valve may alternatively be such a type which is either fully open or completely closed. In such a case, on-off control is made in which when the pressure inside the tank 7 increases above a threshold level, the valve is opened, while when the pressure inside the tank 7 is below the threshold level, the valve is closed.

In the embodiment described, an electromagnetic valve is employed for the adjustment of the pressure in the tank. Other means, such as a shutter, may be used instead.

Figure 1:
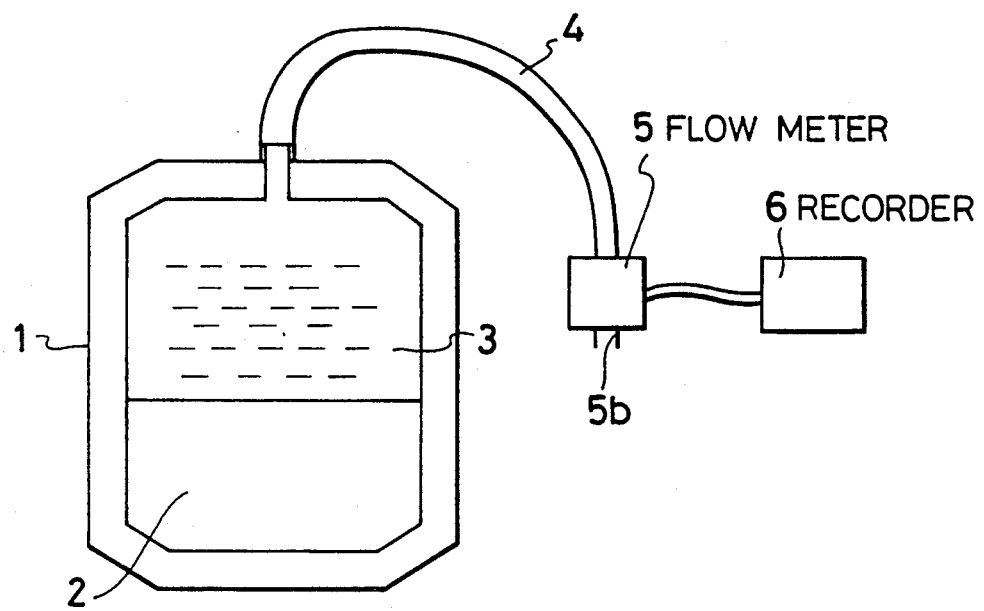
FIG. 1 is a schematic view showing a prior-art freezing agent consumption measurement system.
Figure 3:
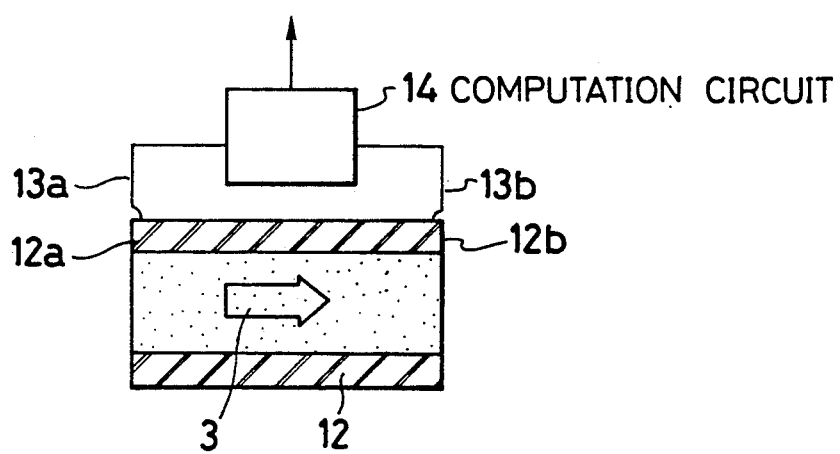
FIG. 3 is a schematic view showing an example of gas flow meter.

An example of the flow meter 5 is shown in FIG. 3. As illustrated, it comprises a pipe 12 having a first end 12a constituting the inlet 5a of the flow meter 5 and a second end 12b constituting the outlet 5b of the flow meter 5. The pipe 12 is made of a resistive heat-generating material. First and second thermocouples 13a and 13b are provided to detect the temperature at the first and second ends 12a and 12b of the pipe 12. A computation circuit 14 connected to the thermocouples 13a and 13b, and determines the flow rate in accordance with the temperature difference. A signal output from the computation circuit 14 is supplied to the recorder 6.

The pipe 12 is heated to a temperature above the temperature of the gas flowing through it. The flow rate is measured by the temperature differnce between both ends of the pipe 12 due to the absorption of heat from the pipe 12 by the gas flowing through the pipe 12.

Figure 4:
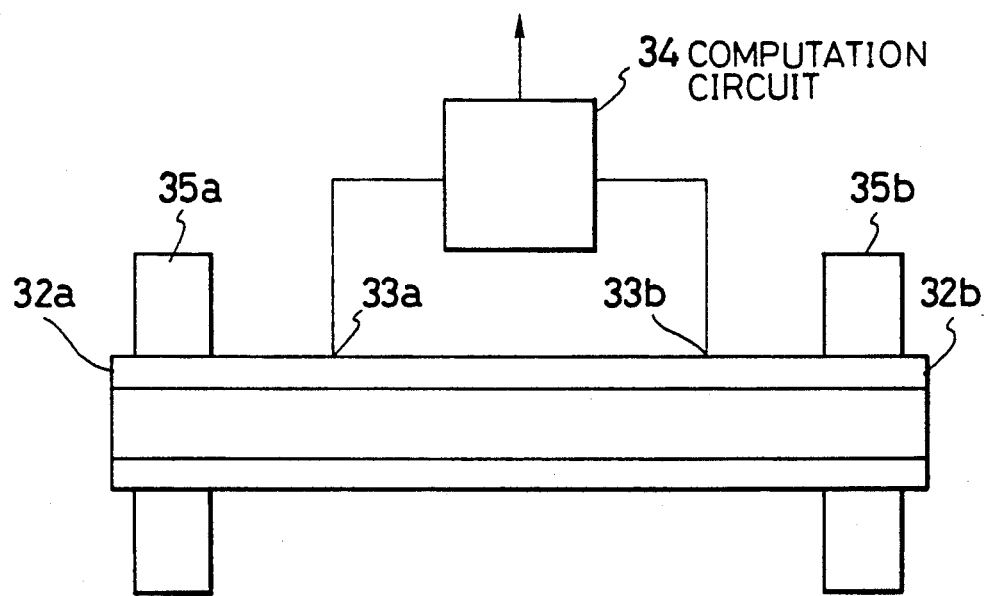
FIG. 4 is a schematic view showing another example of gas flow meter.

Another example of the flow meter is shown in FIG. 4. The flow meter of this example comprises a pipe 32 having a first end 32a constituting the inlet 5a of the flow meter 5, and a second end 32b constituting the outlet 5b of the flow meter 5. Provided at both ends of the pipe 32 are heat sinks 35a and 35b maintained at a temperature higher than the gas flowing through the pipe 32. A first thermocouple 33a is provided to detect the temperature at a first point between the heat sink 35a at the first end 32a and the mid-point of the pipe 32. A second thermocouple 33b is provided to detect the temperature at a second point between the heat sink 35b at the second end 32b and the mid-point of the pipe 32. A computation circuit 34 connected to the thermocouples 33a and 33b, and determines the flow rate in accordance with the temperature difference. A signal output from the computation circuit 34 is supplied to the recorder 6.

The flow rate is measured by the temperature difference between first and second points detected by the thermocouples 33a and 33b due to the absorption of heat from the pipe 32 by the gas flowing through the pipe 32.

In place of the gas mass flow meter 5, a flow meter measuring the flow rate in volume may be used.

In the embodiment described, the flow meter measures the flow rate and the recorder records the flow rate with time. But there may be provided a device for measuring the total amount of flow (accumulated value) responsive to the output of the flow meter 5. The term "flow" as used in the appended claims should be construed to include both flow rate and the accumulated amount of flow.

In place of the hose, any other conduit means for conducting the evaporated gas, e.g., a pipe, may be used.

What is claimed is:

1. A freezing agent consumption measurement system for measuring the consumption of a freezing agent in a low-temperature container, said consumption being due to evaporation of the freezing agent, comprising:
   gas flow path means communicating with said low-temperature container for conducting the evaporated gas from the container to the atmosphere;
   measuring means provided in the gas flow path means to measure the flow of the evaporated gas from the freezing agent;
   a tank provided in the gas flow path means at a position downstream of said measuring means;
   pressure measuring means for measuring the pressure within the tank; and
   means, disposed downstream of said tank and responsive to said pressure measuring means, for maintaining the pressure in the tank at a predetermined value;
   whereby the flow of the gas as measured by the gas flow measuring means corresponds to the consumption of the freezing agent.

2. The system of claim 1, wherein said pressure maintaining means maintains the pressure at a pressure a little higher than the range of pressure over which the atmospheric pressure varies under normal conditions.

3. The system of claim 2, wherein said pressure measuring means comprises a pressure sensor, and said pressure maintaining means comprises a means for releasing the gas to the atmosphere in accordance with the result of the detection.

4. The system of claim 3, wherein said pressure releasing means comprises an electromagnetic valve, and said pressure maintaining means comprises a controller adjusting the opening of the electromagnetic valve responsive to the output of the pressure sensor.

5. The system of claim 1, wherein said means for measuring the gas flow rate is provided between the container and said tank.

* * * * *